United States Patent
Kerner et al.

(10) Patent No.: US 9,818,110 B2
(45) Date of Patent: *Nov. 14, 2017

(54) METHOD, MEDIUM, AND SYSTEM FOR FACILITATING ONLINE TRANSACTIONS

(71) Applicant: AMERICAN EXPRESS TRAVEL RELATED SERVICES COMPANY, INC., New York, NY (US)

(72) Inventors: Robert Kerner, St. Petersburg, FL (US); Weidong Tang, Herndon, VA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/925,114

(22) Filed: Oct. 28, 2015

(65) Prior Publication Data
US 2016/0048832 A1    Feb. 18, 2016

Related U.S. Application Data

(63) Continuation of application No. 12/054,164, filed on Mar. 24, 2008, now Pat. No. 9,208,485.

(51) Int. Cl.
*G06Q 30/00* (2012.01)
*G06Q 20/38* (2012.01)
(Continued)

(52) U.S. Cl.
CPC ......... *G06Q 20/3821* (2013.01); *G06Q 20/02* (2013.01); *G06Q 20/10* (2013.01);
(Continued)

(58) Field of Classification Search
CPC .... G06C 20/3821; G06C 20/02; G06C 20/10; G06C 20/26; G06C 20/385; G06C 20/401;
(Continued)

(56) References Cited

U.S. PATENT DOCUMENTS

| 4,408,203 A | 10/1983 | Campbell |
| 4,797,920 A | 1/1989 | Stein |

(Continued)

FOREIGN PATENT DOCUMENTS

| KR | 1020000064158 | 11/2000 |
| KR | 1020010065400 | 7/2001 |

(Continued)

OTHER PUBLICATIONS

Phillips, David J. "The social construction of a secure, anonymous electronic payment system: frame alignment and mobilization around Ecash." Journal of Information Technology 13.4 (1998): 273.*

(Continued)

*Primary Examiner* — Matthew Zimmerman
(74) *Attorney, Agent, or Firm* — Snell & Wilmer L.L.P.

(57) ABSTRACT

Methods and systems for facilitating online transactions are disclosed. One method includes supplying content for display in a frame of a website, the website hosted by a third-party. The method also includes receiving transaction information from the third-party, and returning a token to the frame, the token including state information based on the transaction information. The method further includes passing the token from the frame to the third-party. The method optionally also includes receiving the token from the third-party and transferring funds from a first account to a second account based on the transaction information and the state information.

19 Claims, 10 Drawing Sheets

(51) Int. Cl.
*G06Q 20/02* (2012.01)
*G06Q 20/10* (2012.01)
*G06Q 20/26* (2012.01)
*G06Q 30/06* (2012.01)
*G06Q 20/40* (2012.01)

(52) U.S. Cl.
CPC ........... *G06Q 20/26* (2013.01); *G06Q 20/385* (2013.01); *G06Q 20/401* (2013.01); *G06Q 30/06* (2013.01); *G06Q 30/0601* (2013.01); *G06Q 2220/00* (2013.01)

(58) Field of Classification Search
CPC ................ G06C 30/06; G06C 30/0601; G06C 2220/00
See application file for complete search history.

(56) References Cited

U.S. PATENT DOCUMENTS

| | | | |
|---|---|---|---|
| 4,906,826 A | 3/1990 | Spencer | |
| 4,908,521 A | 3/1990 | Boggan et al. | |
| 4,943,707 A | 7/1990 | Boggan | |
| 5,136,633 A | 8/1992 | Tejada et al. | |
| 5,177,342 A | 1/1993 | Adams | |
| 5,255,182 A | 10/1993 | Adams | |
| 5,384,449 A | 1/1995 | Peirce | |
| 5,396,624 A | 3/1995 | Campbell, Jr. | |
| 5,455,406 A | 10/1995 | Terashima et al. | |
| 5,557,516 A | 9/1996 | Hogan | |
| 5,692,132 A | 11/1997 | Hogan | |
| 5,699,528 A | 12/1997 | Hogan | |
| 5,703,344 A | 12/1997 | Bezy et al. | |
| 5,704,046 A | 12/1997 | Hogan | |
| 5,710,887 A * | 1/1998 | Chelliah | G06Q 20/12 705/26.62 |
| 5,715,314 A | 2/1998 | Payne et al. | |
| 5,761,306 A | 6/1998 | Lewis | |
| 5,878,215 A | 3/1999 | Kling et al. | |
| RE36,365 E | 11/1999 | Levine et al. | |
| 6,018,723 A | 1/2000 | Siegel et al. | |
| RE36,788 E | 7/2000 | Mansvelt et al. | |
| 6,119,103 A | 9/2000 | Basch et al. | |
| RE37,122 E | 4/2001 | Levine et al. | |
| 6,298,336 B1 | 10/2001 | Davis et al. | |
| 6,315,193 B1 | 11/2001 | Hogan | |
| 6,381,315 B1 | 4/2002 | Nhaissi | |
| 6,457,005 B1 | 9/2002 | Torrey | |
| 6,473,500 B1 | 10/2002 | Risafi et al. | |
| 6,560,581 B1 | 5/2003 | Fox et al. | |
| 6,578,768 B1 | 6/2003 | Binder et al. | |
| 6,604,107 B1 | 8/2003 | Wang et al. | |
| RE38,255 E | 9/2003 | Levine et al. | |
| 6,681,328 B1 | 1/2004 | Harris et al. | |
| 6,732,161 B1 | 5/2004 | Hess et al. | |
| 6,748,367 B1 | 6/2004 | Lee | |
| 6,793,131 B2 | 9/2004 | Hogan | |
| 6,857,566 B2 | 2/2005 | Wankmueller | |
| 6,915,279 B2 | 7/2005 | Hogan et al. | |
| 6,938,013 B1 | 8/2005 | Gutierrez-Sheris | |
| 6,957,334 B1 | 10/2005 | Goldstein et al. | |
| 6,990,470 B2 | 1/2006 | Hogan et al. | |
| 6,999,569 B2 | 2/2006 | Risafi et al. | |
| 7,031,939 B1 | 4/2006 | Gallagher et al. | |
| 7,039,809 B1 | 5/2006 | Wankmueller | |
| 7,058,611 B2 | 6/2006 | Kranzley et al. | |
| 7,080,328 B1 | 7/2006 | Sawyer | |
| 7,089,208 B1 | 8/2006 | Levchin et al. | |
| 7,120,608 B1 | 10/2006 | Gallagher et al. | |
| 7,146,344 B2 | 12/2006 | Wankmueller | |
| 7,152,782 B2 | 12/2006 | Shenker et al. | |
| 7,168,615 B2 | 1/2007 | Smith | |
| 7,177,848 B2 | 2/2007 | Hogan et al. | |
| 7,191,151 B1 | 3/2007 | Nosek | |
| 7,227,950 B2 | 6/2007 | Faith et al. | |
| 7,249,093 B1 | 7/2007 | King | |
| 7,249,094 B2 | 7/2007 | Levchin et al. | |
| 7,252,226 B2 | 8/2007 | Risafi et al. | |
| 7,287,695 B2 | 10/2007 | Wankmueller | |
| 7,290,364 B2 | 11/2007 | Nelms et al. | |
| 7,299,206 B2 | 11/2007 | Taylor et al. | |
| 7,299,974 B2 | 11/2007 | Smets et al. | |
| 7,318,049 B2 | 1/2008 | Iannacci | |
| 7,320,021 B2 | 1/2008 | Lalonde et al. | |
| 7,340,429 B2 | 3/2008 | Maltzman | |
| 7,343,335 B1 | 3/2008 | Olliphant | |
| 7,350,192 B2 | 3/2008 | Seitz et al. | |
| 7,356,507 B2 | 4/2008 | Bezos et al. | |
| 7,369,505 B2 | 5/2008 | Mengerink | |
| 7,370,011 B2 | 5/2008 | Bennett et al. | |
| 7,373,317 B1 | 5/2008 | Kopelman et al. | |
| 7,373,319 B2 | 5/2008 | Kopelman et al. | |
| 7,373,329 B2 | 5/2008 | Gallagher et al. | |
| 7,374,082 B2 | 5/2008 | Van De Velde et al. | |
| 7,379,919 B2 | 5/2008 | Hogan et al. | |
| 7,406,464 B2 | 7/2008 | Kasten et al. | |
| 7,406,529 B2 | 7/2008 | Reed | |
| 8,083,133 B2 | 12/2011 | Seifert et al. | |
| 9,208,485 B2 | 12/2015 | Kerner et al. | |
| 2002/0194124 A1 | 12/2002 | Hobbs et al. | |
| 2004/0044739 A1* | 3/2004 | Ziegler | G06Q 20/02 709/213 |
| 2005/0077350 A1 | 4/2005 | Courtion et al. | |
| 2005/0228750 A1 | 10/2005 | Olliphant et al. | |
| 2005/0256806 A1 | 11/2005 | Tien et al. | |
| 2007/0078767 A1 | 4/2007 | Gendelman | |
| 2007/0136194 A1 | 6/2007 | Sloan | |
| 2007/0187492 A1 | 8/2007 | Graves et al. | |
| 2007/0226141 A1 | 9/2007 | Phillips et al. | |
| 2007/0245022 A1 | 10/2007 | Olliphant et al. | |
| 2009/0006203 A1 | 1/2009 | Fordyce, III et al. | |
| 2009/0177582 A1 | 7/2009 | Cucinotta | |
| 2009/0240594 A1 | 9/2009 | Kerner et al. | |
| 2010/0100481 A1 | 4/2010 | Doran et al. | |
| 2010/0285818 A1 | 11/2010 | Crawford | |
| 2010/0287044 A1 | 11/2010 | Mason | |
| 2010/0299194 A1 | 11/2010 | Snyder et al. | |
| 2011/0099055 A1 | 4/2011 | Khalil | |
| 2011/0196753 A1 | 8/2011 | Hodgdon et al. | |

FOREIGN PATENT DOCUMENTS

| | | |
|---|---|---|
| KR | 1020020071144 | 9/2002 |
| WO | 0118720 | 3/2001 |
| WO | 02005231 | 7/2002 |

OTHER PUBLICATIONS

Advisory Action dated Apr. 5, 2016 in U.S. Appl. No. 13/026,013.
Advisory Action dated Apr. 5, 2016 in U.S. Appl. No. 13/026,024.
Final Office Action dated Feb. 3, 2016 in U.S. Appl. No. 13/026,024.
Advisory Action dated Apr. 12, 2017 in U.S. Appl. No. 13/026,013.
Advisory Action dated Apr. 13, 2017 in U.S. Appl. No. 13/026,024.
Advisory Action dated Dec. 12, 2016 in U.S. Appl. No. 13/025,965.
Office Action dated Aug. 4, 2016 in U.S. Appl. No. 13/025,965.
Office Action dated Oct. 14, 2016 in U.S. Appl. No. 13/026,013.
Office Action dated Oct. 21, 2016 in U.S. Appl. No. 13/026,024.
Final Office Action dated Feb. 28, 2017 in U.S. Appl. No. 13/026,013.
Final Office Action dated Feb. 28, 2017 in U.S. Appl. No. 13/026,024.
Final Office Action dated Feb. 3, 2016 in U.S. Appl. No. 13/026,013.
Advisory Action dated Feb. 9, 2016 in U.S. Appl. No. 13/025,965.
Office Action dated Oct. 8, 2015 in U.S. Appl. No. 13/026,024.
Office Action dated Oct. 13, 2015 in U.S. Appl. No. 13/026,013.
Final Office Action dated Nov. 24, 2015 in U.S. Appl. No. 13/025,965.
International Search Report dated Nov. 26, 2010 in Application No. PCT/US2009/037965.

(56) References Cited

OTHER PUBLICATIONS

Written Opinion dated Nov. 26, 2010 in Application No. PCT/US2009/037965.
International Search Report and Written Opinion dated May 31, 2011 in Application No. PCT/US2011/031059.
Office Action Restriction dated Aug. 31, 2010 in U.S. Appl. No. 12/054,164.
Office Action dated Oct. 15, 2010 in U.S. Appl. No. 12/054,164.
UFinal Office Action dated Jul. 22, 2011 in U.S. Appl. No. 12/054,164.
Advisory Action dated Sep. 28, 2011 in U.S. Appl. No. 12/054,164.
International Preliminary Report on Patentability dated Dec. 6, 2010 in Application No. PCT/US2009/037965.
Office Action dated Dec. 26, 2011 in Application No. 200980118520.X.
Office Action dated May 3, 2012 in U.S. Appl. No. 13/026,024.
International Preliminary Report on Patentability dated May 14, 2012 in Application No. PCT/US2011/031059.
Office Action dated Jun. 13, 2012 in U.S. Appl. No. 13/025,965.
Office Action dated Jun. 29, 2012 in U.S. Appl. No. 13/026,013.
Office Action dated Jul. 31, 2012 in Chinese Application No. 200980118520.X.
Final Office Action dated Aug. 23, 2012 in U.S. Appl. No. 13/026,024.
Final Office Action dated Sep. 26, 2012 in U.S. Appl. No. 13/025,965.
Final Office Action dated Oct. 23, 2012 in U.S. Appl. No. 13/026,013.
Advisory Action dated Oct. 23, 2012 in U.S. Appl. No. 13/026,024.
Advisory Action dated Nov. 30, 2012 in U.S. Appl. No. 13/025,965.
Advisory Action dated Jan. 2, 2013 in U.S. Appl. No. 13/026,013.
Search Report dated Jan. 16, 2013 in European Application No. 09751042.4.
Office Action dated Mar. 5, 2013 in Chinese Application No. 200980118520.X.
Office Action dated Jun. 27, 2013 in Canadian Application No. 2,719,941.
Office Action dated Jun. 5, 2014 in U.S. Appl. No. 12/054,164.
Office Action dated Aug. 6, 2014 in U.S. Appl. No. 13/025,965.
Office Action dated Aug. 22, 2014 in U.S. Appl. No. 13/026,013.
Office Action dated Aug. 26, 2014 in U.S. Appl. No. 13/026,024.
Office Action dated Oct. 7, 2014 in U.S. Appl. No. 12/054,164.
Final Office Action dated Dec. 5, 2014 in U.S. Appl. No. 13/025,965.
Final Office Action dated Dec. 5, 2014 in U.S. Appl. No. 13/026,013.
Final Office Action dated Dec. 5, 2014 in U.S. Appl. No. 13/026,024.
Advisory Action dated Feb. 20, 2015 in U.S. Appl. No. 13/025,965.
Advisory Action dated Feb. 20, 2015 in U.S. Appl. No. 13/026,013.
Advisory Action dated Feb. 23, 2015 in U.S. Appl. No. 13/026,024.
Final Office Action dated Apr. 8, 2015 in U.S. Appl. No. 12/054,164.
Advisory Action dated Jul. 7, 2015 in U.S. Appl. No. 12/054,164.
Notice of Allowance dated Aug. 12, 2015 in U.S. Appl. No. 12/054,164.
"Electronic Funds Transfer Association Announces New Groundbreaking Guidelines for Secure, Real-time Debit Transation Purchases over the Internet," Business Editors/Hi-Tech Writers, Business Wire, Mar. 6, 2001, retrieved from Proquest Aug. 6, 2015.
Office Action dated Sep. 1, 2015 in U.S. Appl. No. 13/025,965.
Final Office Action dated Jun. 21, 2017 in U.S. Appl. No. 13/025,965.
Notice of Allowance dated Aug. 10, 2017 in U.S. Appl. No. 13/026,024.
Notice of Allowance dated Aug. 11, 2017 in U.S. Appl. No. 13/026,013.

* cited by examiner

```
Host Page: http://www.3rdparty_website_here.com

Function sendData() {
        iframe.src = " http://www.revolutionmoney.com/exchange/..." ;
}

Hidden iframe (www.revolutionmoney.com/exchange/...

Window.onLoad = function () {
            data = window.location.hash;                502
    }
```

Third-Party Confirmation Page

Congratulations! Your purchase is complete!

METHOD, MEDIUM, AND SYSTEM FOR FACILITATING ONLINE TRANSACTIONS

CROSS-REFERENCE TO RELATED APPLICATIONS

This application is a continuation of, claims priority to and the benefit of, U.S. Ser. No. 12/054,164 filed Mar. 24, 2008 and entitled "SYSTEM AND METHOD FOR FACILITATING ONLINE TRANSACTIONS" which is incorporated herein in its entirety by reference.

TECHNICAL FIELD

The present disclosure relates generally to payment systems used in conjunction with online transactions. In particular, the present disclosure relates to a system and method for facilitating online transactions, such as through real-time online funds transfer.

BACKGROUND OF THE INVENTION

Online sales systems, such as are used by online retailers, auction sites, and other systems, require payment mechanisms to facilitate a funds transfer to a seller of goods and services from a buyer of those goods and services. Existing sales systems typically rely on credit card companies for payment processing and management of payment systems. However, credit card systems have drawbacks. For example, credit card companies charge processing fees to sellers. Credit card companies also limit buyers to certain types of cards; this can limit the universe of potential buyers, because those buyers may not have the type of credit card accepted by the particular retailer.

More recently, online sales systems have attempted to integrate direct payment systems to perform simple money transfer tasks, thereby avoiding use of credit cards or other similar credit-based systems. In these systems, a payment mechanism allows a direct funds transfer between accounts managed by buyers and sellers. However, the existing direct payment systems have disadvantages as well. For example, these existing direct payment systems do not share data with online sales systems in real time. Rather, all information relating to a sale or other transaction is collected by the sales system, and the sale is confirmed without full information relating to whether funds are available for transfer via the direct payment system. After the sales transaction completes, the direct payment system receives the information relating to the transaction and performs the actual funds transfer. However, if funds are in fact not available in a buyer's account, the seller will have incorrectly completed the sales transaction, because in fact the seller's price could not have been paid by the buyer at the time of the sale. These transactions must be subsequently canceled, causing possible inventory restocking, scheduling, or other issues. Other direct payment systems generally require the buyer to be redirected completely away from the seller's website to perform the funds transfer transaction required by the purchase.

For these and other reasons, improvements are desirable.

SUMMARY OF THE INVENTION

In accordance with the following disclosure, the above and other problems are solved by the following:

In a first aspect, a method for facilitating online transactions is disclosed. The method includes supplying content for display in a frame of a website, the website hosted by a third-party. The method also includes receiving transaction information from the third-party, and returning a token to the frame, the token including state information based on the transaction information. The method further includes passing the token from the frame to the third-party. The method optionally also includes receiving the token from the third-party and transferring funds from a first account to a second account based on the transaction information and the state information.

In a second aspect, a system for facilitating online transactions is disclosed. The system includes a memory configured to store account information related to one or more users. The system also includes a programmable circuit in electrical communication with the memory. The programmable circuit is configured to execute program instructions to supply content for display in a frame of a website, the website hosted by a third-party, and to receive transaction information from the third-party. The programmable circuit is further configured to execute program instructions to return a token to the frame, the token including state information based on the transaction information and the account information. The programmable circuit is also configured to execute program instructions to pass the token from the frame to the third-party.

In a third aspect, a method of executing one or more online transactions is disclosed. The method includes hosting a webpage including a frame, the frame configured to display content from a remote system unaffiliated with the webpage. The method also includes passing transaction information to the remote system, the transaction information relating to a transaction. The method further includes receiving a token from the frame, the token including state information based on the transaction information. The method includes receiving a request to execute a transaction from a customer, and, upon receiving the request, transmitting the token to the remote system.

In a fourth aspect, a system useable to execute one or more online transactions is disclosed. The system includes a memory configured to store information relating to one or more transactions. The system also includes a programmable circuit in electrical communication with the memory. The programmable circuit is programmed to host a webpage including a frame, the frame configured to display content from a remote system unaffiliated with the webpage. The programmable circuit is further programmed to pass transaction information to the remote system, the transaction information relating to a transaction. The programmable circuit is also programmed to receive a token from the frame, the token including state information based on the transaction information. The programmable circuit is also programmed to receive a request to execute a transaction from a customer, and, upon receiving the request, transmit the token to the remote system.

BRIEF DESCRIPTION OF THE DRAWINGS

FIG. 5 illustrates an example schematic webpage incorporating a frame with which data can be exchanged, according to a possible embodiment of the present disclosure;

FIG. 10 illustrates a schematic confirmation webpage displayed following execution of a purchase of goods or services.

DETAILED DESCRIPTION

Figure 1:
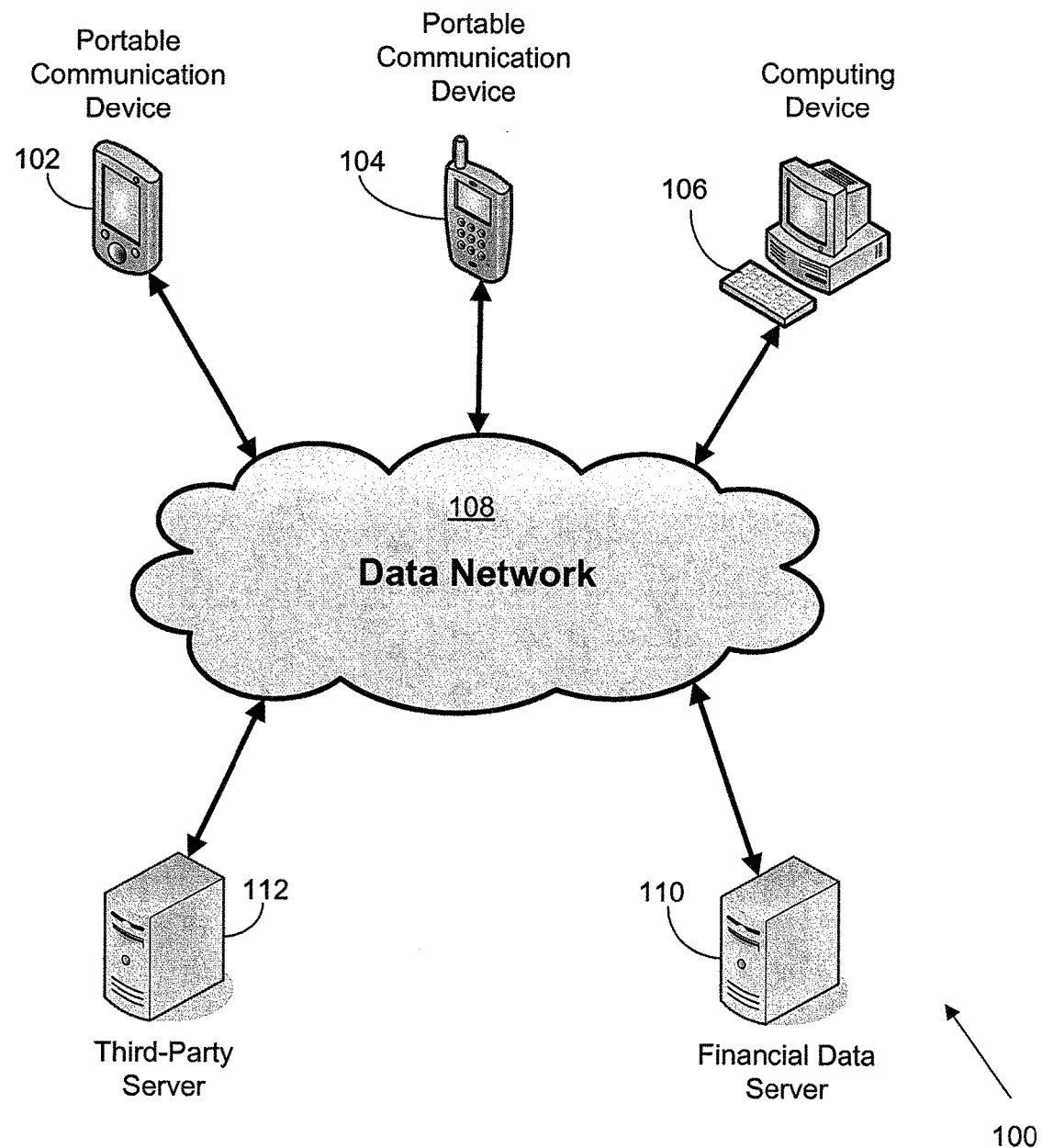
FIG. 1 is a schematic depiction of a network in which aspects of the present disclosure can be embodied.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

In general, the present disclosure relates to methods and systems for facilitating and executing online transactions, such as for purchase and sale of goods and services. The present disclosure contemplates a system that, among other aspects, supplies content for display in a frame of a third-party website, and can receive information about a transaction managed at that third-party website. By returning a token into the frame that includes the state of the transaction (e.g. by confirming that sufficient funds exist for the transaction to complete successfully), and then passing that token from the frame to the third-party, that third-party receives real-time information about the state (passed or failed) of the transaction and can either complete or choose not to complete the transaction based on that information.

By third-party, it is intended that the third-party website represent a website not managed by a transaction facilitator, such as a direct funds exchange system. The third-party website also requires no integrated relationship with a funds exchange system. The website is referred to as being a "third-party" website in that it is not affiliated with either the funds exchange system or any client accounts on that system, which typically would belong to a buyer using the third-party website.

Referring now to FIG. 1, an example network 100 is shown, within which aspects of the present disclosure can be implemented. The network 100 includes a number of electronic devices, shown as devices 102, 104, 106. For example, the electronic devices 102, 104, 106 can be any of a number of types of personal computers, smartphones, portable computing devices with telecommunications capabilities, or handheld devices. Also note that electronic devices (also described herein as communications devices, generally) include, but are not limited to, personal digital assistants (PDA), computing systems, pocket personal computers (pocket PCs), MP3 players, set top boxes, and other such systems.

The electronic devices 102, 104 can be any of a number of types of devices capable of connecting to a data network 108, such as the internet. The data network 108 is a packet-based data network capable of sending and receiving digital data, such as the internet or some portion thereof. The data network 106 can operate on any of a number of protocols or file formats.

A financial server 110 and third-party transaction server 112 are also connected to the data network 108, and provide various services accessible to users of the electronic devices 102, 104, 106. For example, the financial server 110 provides money or other value exchange services to users of the network 100, such as for payment in exchange for goods or services. The financial server 110 can provide, in various embodiments, a direct user-to-user payment system in which money transfers and payment negotiation can take place without requiring use of a third-party to route money transfers.

The third-party transaction server 112 provides a location at which one or more users can offer for sale a variety of goods or services. The third-party service provider 112 can be an online retailer, or can be an online community in which individual users can offer goods or services for sale, such as an online auction site or sales bulletin board.

In certain instances, the third-party transaction server 112 does not have preset payment relationships with value transfer services. In such instances, the third-party transaction server 112 can place code within its hosted websites to allow for in-page transaction confirmation by allowing data sharing between a frame managing the fund transfer (e.g. hosted by the financial server 110) and the webpage hosted by the third-party transaction server 112. The frame directs interested buyers to a webpage managed by an remote system acting as an exchange facilitator (e.g. the manager or provider of the financial server 110 for exchanging money/value for the goods and services) to manage funds transfer within the frame. One example of use of such a system is shown in FIGS. 6-10, below.

Figure 2:
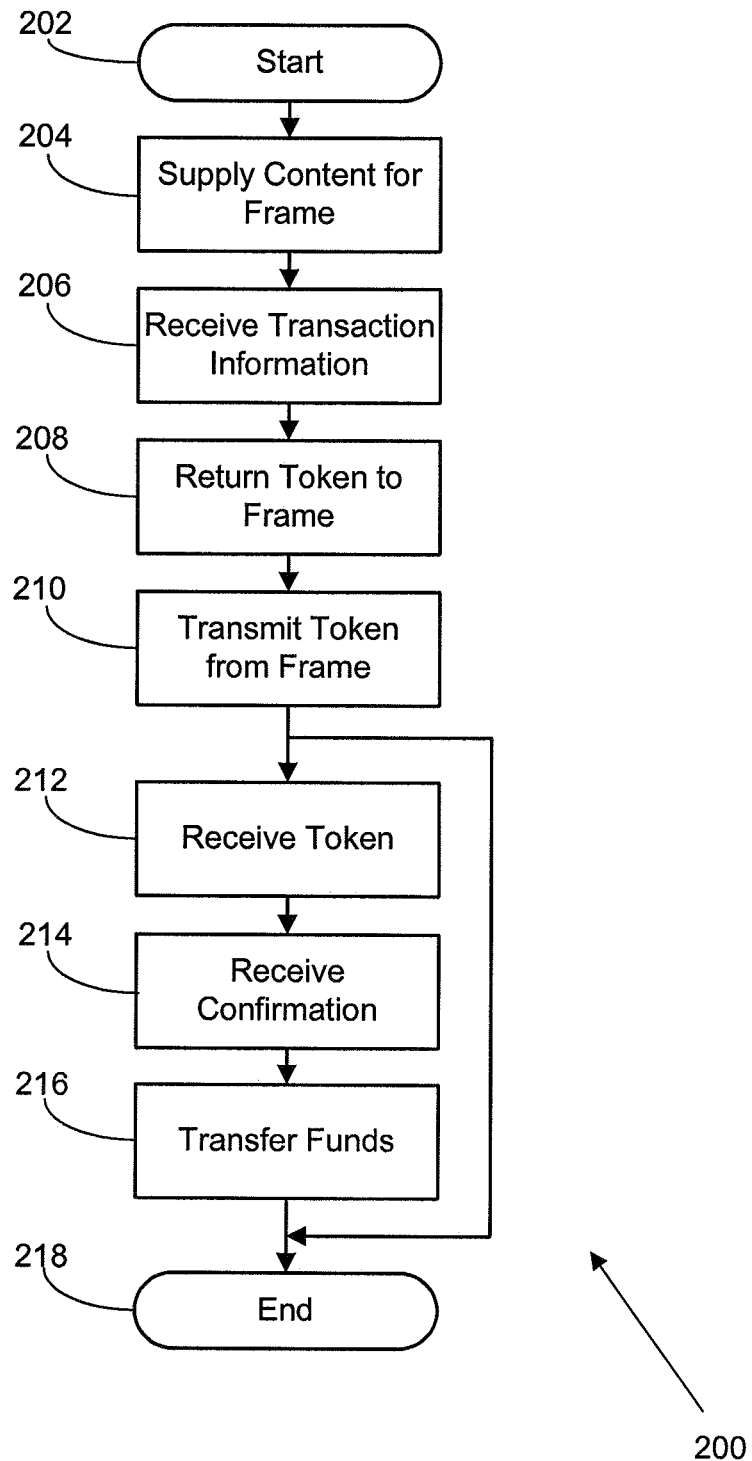
FIG. 2 is a flowchart of methods and systems for facilitating online transactions, according to a possible embodiment of the present disclosure.

FIG. 2 is a flowchart of methods and systems for facilitating online transactions, according to a possible embodiment of the present disclosure. The methods and systems described facilitate online transactions, such as purchase or sale of goods and services, by providing real-time (during the transaction) information regarding funds available to the buyer. This real-time information allows the third-party to be sure that the buyer is properly authorized to purchase the goods/services, based on funds observed to be available to the buyer.

The system 200 of FIG. 2 generally relates to operations performed by a transaction facilitator, such as a direct payment coordination system. The system 200 allows interaction with the third-party, and acts as an inserted transaction feasibility verification prior to the third-party allowing the transaction to execute. An example of a transaction facilitator is the financial server 110 of FIG. 1.

The system 200 is instantiated at a start operation 202, which corresponds to initiation of an online transaction, such as would occur when a customer seeks to "check out" at an online retailer. Operational flow proceeds to a content module 204, which supplies content for display by a third-party website. The content module 204 supplies content formatted for display in a frame of the third-party website. The third-party website is generally a website hosted by a server, such as the third-party server 112 of FIG. 1. The third-party can be any of a number of types of entities capable of buying or selling goods and services, or facilitating the buying and selling of goods and services online. Examples of such third-parties include an online retailer, online auction site, or other similar entities.

The frame created for display of the content provided via the content module 204 is generally created by source code inserted into a webpage by the third-party. The frame is generally an inserted frame in a webpage, in which an entity other than the host of the website (in this case the third-party) can display content. An example of such a frame is shown in FIG. 5, below.

In certain embodiments of the present disclosure, the webpage displays information relating to a proposed transaction to be completed. This transaction can be, for example, between two parties, one of which could be the third-party host of the website. One example of such a transaction is an online sale of goods; in such an example, the webpage can correspond to a "shopping cart" page. Other example webpages in which a frame for non-host content are possible as well.

In certain further embodiments, the content displayed in the frame relates to user authentication of the buyer or seller visiting the third-party website. The content module 204 can display a window requesting a username and password or other authentication information (access code, PIN, etc.), requiring the visiting buyer or seller to provide credentials for logging in to the transaction facilitation system. In embodiments in which the transaction facilitation system is a direct funds transfer system, the authentication information generally allows access to a user account having available to it an amount of funds (e.g. via a credit line, an existing account with the financial institution managing the system 200, or connection to an existing account with a different financial institution).

Operational flow proceeds to a transaction information receipt module 206. The transaction information receipt module 206 receives transaction information from the third-party, such as by passing that information to the frame incorporated into the webpage. The transaction information can be a variety of different types of information relating to the transaction, and will generally include at least the identity of the buyer and the amount of funds required for the purchase. Additional information, such as relating to the identity of the seller or the goods or services purchased can be included as well.

The transaction information receipt module 206 can receive data passed to it from the webpage or from the third-party directly, by any of a number of methods in which the third-party is allowed data communication access with the frame inserted into the webpage hosting the frame. In one embodiment, data is passed to the frame upon instantiation of the frame, via the command creating the frame. An example of such a method is disclosed in FIG. 5, below.

Figure 7:
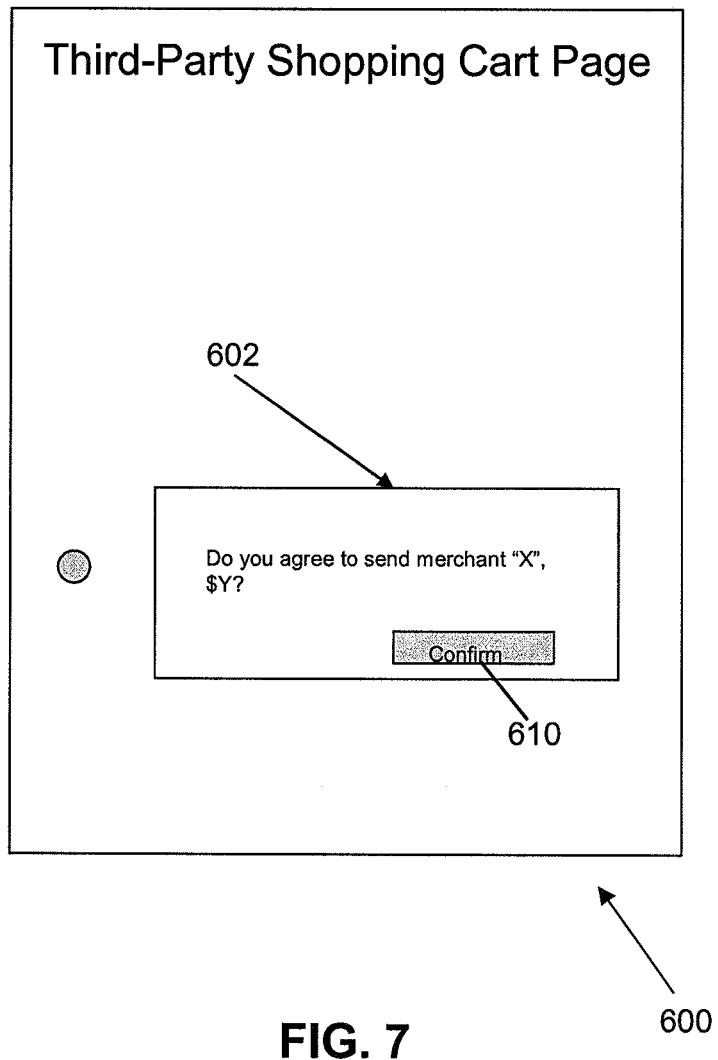
FIG. 7 illustrates the schematic shopping cart webpage of FIG. 6 including a frame displaying a payment confirmation request, according to a possible embodiment of the present disclosure.

In certain embodiments, the transaction information receipt module 206 displays a confirmation page to a user prior to transmission of the transaction information to the third-party. The confirmation page displays a message to the user requesting confirmation to validate a transaction, and also displays a button prompting the user to proceed. The transaction information receipt module 206 receives a request to execute the transaction by detecting the user clicking on the button. An example of such a page is shown in FIG. 7, below.

Operational flow proceeds to a token return module 208, which returns a token to the frame hosted in the third-party website. The token return module 208 transmits the token to the frame based on standard web-based, IP addressing methods. The token returned to the frame by the token return module 208 includes state information. The state information generally corresponds to information generated by the transaction facilitator regarding the feasibility of the transaction. For example, the state information can refer to the status of one or more accounts of a customer seeking to purchase goods or services on the third-party website. In an embodiment in which the transaction facilitator is a direct payment facilitator, the token can verify the existence of an account identified using the transaction information received via the transaction information receipt module 206. In such an embodiment, the token can also verify whether the account, once identified, contains sufficient funds to complete the transaction, based on the transaction information.

Operational flow proceeds to a token transmission module 210. The token transmission module passes the token from the frame in the website to the server hosting the website, so that the third-party hosting the website has the information from the token. At this point, the third-party site gains knowledge of the evaluation performed by the funds transfer facilitation system, and therefore receives information regarding the feasibility of the transaction as determined by, for example, the financial server 110.

At this point, the third-party hosting the frame can determine whether to allow the buyer or seller visiting the website (and viewing the frame) to carry out the transaction. If the third-party does not allow the transaction to proceed (e.g. based on an observation of a token indicating that no account exists or that insufficient funds can be accessed at the account), operation would terminate at the end operation 218, described below. If the third-party allows the transaction to proceed (e.g. by analyzing the token and observing that the transaction would be successful), the third-party may redirect the visiting buyer/seller to a confirmation page.

Operational flow proceeds to a token receipt module 212. The token receipt module corresponds to the transaction facilitator receiving the token from the third-party, allowing the transaction facilitator to know that the transaction should take place. Upon execution of the token receipt module 212, operational flow proceeds to a confirmation module 214, which again confirms the feasibility of the transaction (e.g. based on the existence of the account and the account balance, as compared to the amount of funds requested to perform the transaction). Operational flow proceeds to a funds transfer module 216 to transfer funds from a buyer account to a seller account.

In embodiments of the system 200 in which the third-party is an online retailer, the seller account can correspond to an account held by the third-party itself. In other embodiments of the system 200 in which the third-party facilitates transactions among other parties (e.g. as an online auction or sales forum site), the seller account corresponds to an account of a user of the third-party site.

Operational flow within the system 200 terminates at an end operation 218, which corresponds to a completed (or aborted) funds transfer in conjunction with an online transaction.

As can be seen from the operations of FIG. 2, the transaction facilitator, using the methods and systems described herein, can interject into an online transaction and provide the payment systems for that transaction without disrupting the flow of the online transaction. When the token is passed from the frame to the third-party, the third-party gains knowledge regarding the feasibility of the transaction to be performed. When the token is passed back from the third-party to the financial server (e.g. the source of the content in the frame), the feasibility of the transaction is optionally reconfirmed, and the transaction is completed (e.g. funds are transferred).

Figure 3:
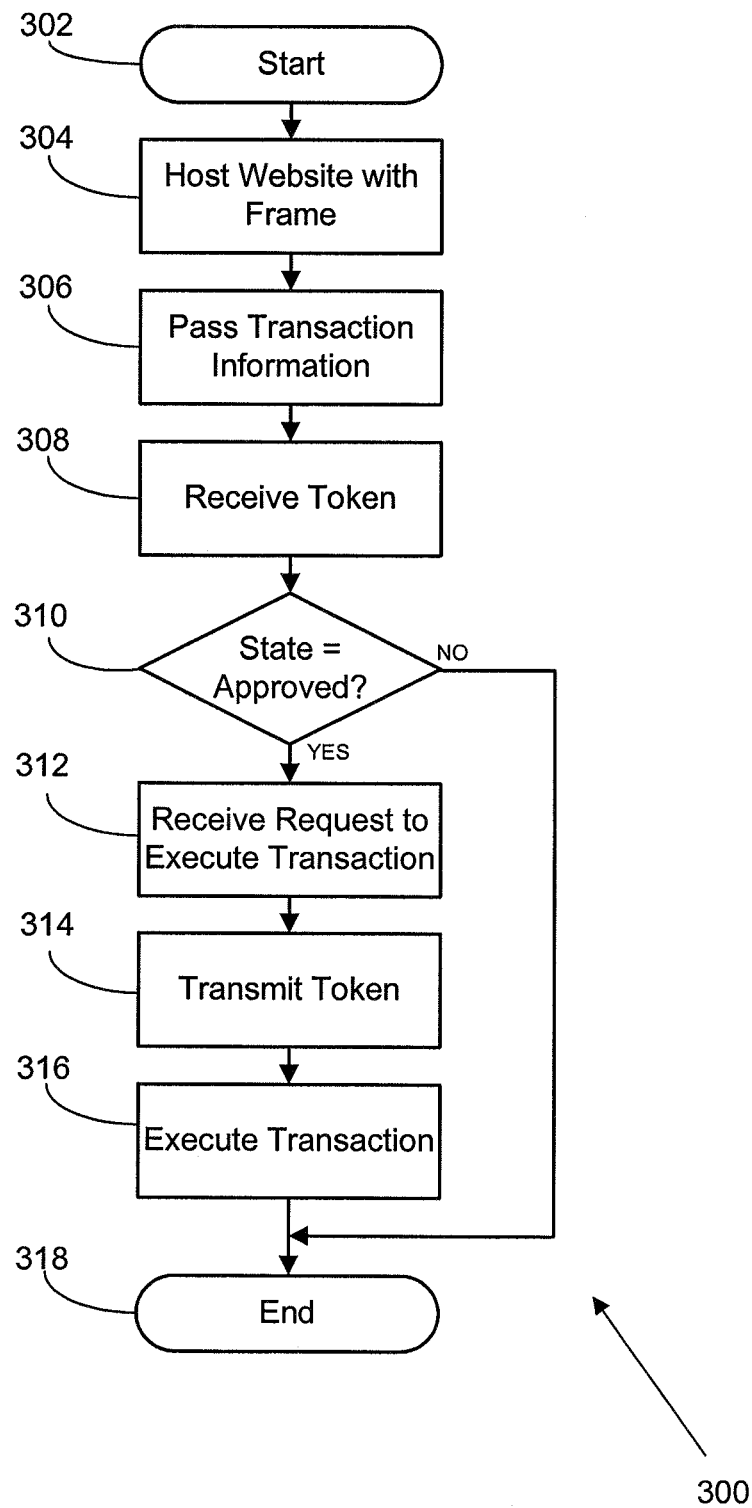
FIG. 3 is a flowchart of methods and systems for performing online transactions, according to a possible embodiment of the present disclosure.

FIG. 3 is a flowchart of methods and systems for performing online transactions, according to a possible embodiment of the present disclosure. The system 300 generally corresponds to activities performed by a third-party server who acts as a host of a website on which purchase/sale transactions take place. The third-party server 300 obtains real-time information regarding the feasibility of a transaction from a remote server that acts as a transaction facilitator by maintaining accounts for one or more users of the third-party server's website. An example of such a remote server is the financial server 110 of FIG. 1.

Operational flow in the system 300 is instantiated at a start operation 302, which corresponds generally to a user of the third-party's website initiating a transaction in which a fund exchange is involved, such as a purchase or sale of goods or services. For example, in embodiments where the third-party is an online retailer or other seller of goods or services, the start operation 302 can correspond to a user clicking on a "shopping cart" button to view an inventory of goods to be purchased.

Operational flow proceeds to a host module 304, which generally corresponds to the third-party hosting a webpage related to a proposed transaction. In certain embodiments, the webpage corresponds to an order confirmation and payment webpage which allows a user to enter payment information for completion of a transaction.

The webpage hosted via the host module 304 includes a frame, which corresponds to an inserted region in the webpage displaying contents retrieved from a separate source. In the various embodiments of the present disclosure, the frame is configured to display content from a remote system unaffiliated with the website. In certain of those embodiments, the remote system corresponds to a financial server (e.g. the financial server 110 of FIG. 1) that is unaffiliated—i.e. not controlled by the third-party—and has access to accounts for one or more buyers and sellers using the third-party website.

Figure 6:
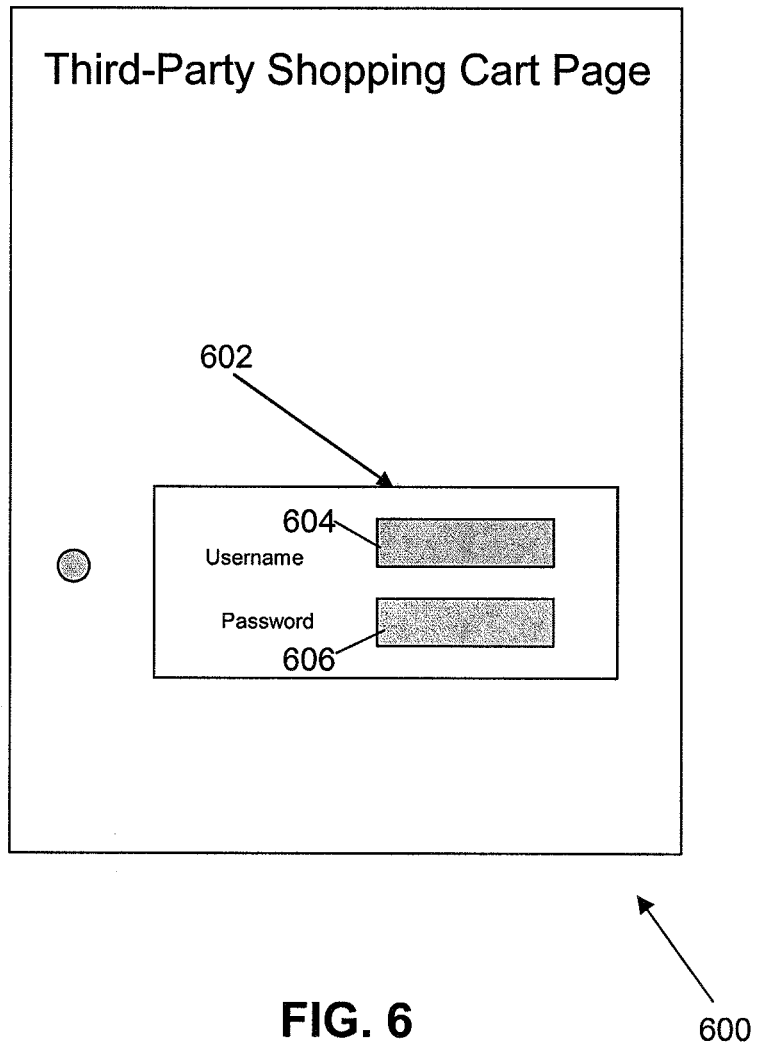
FIG. 6 illustrates an schematic shopping cart webpage including a frame displaying payor authentication fields, according to a possible embodiment of the present disclosure.

Once the host module 304 displays a webpage with a frame included, the remote system unaffiliated with the website can display information in the frame. For example, the remote system can display user authentication information, as described above in conjunction with the content module 204 of FIG. 2. An example of such a page is shown in FIG. 6, below. The remote system also displays a confirmation page, including a confirmation button requesting that a user click the button to confirm that funds are available to complete the transaction. An example of such a page is shown in FIG. 7, below.

Operational flow proceeds to a transaction information module 306, which passes transaction information to the remote system. The transaction information passed to the remote system can vary according to different embodiments of the present disclosure. In general, the transaction information will include information regarding a buyer of goods or services who is using the third-party website. The transaction information can also include information regarding the account to access, an amount of funds that is to be approved for use in the transaction, the name and account of the seller, and other information.

After the transaction information module 306 transmits information to the remote server (e.g. the financial server 110), that remote server generally generates and returns a token to the frame relating to the feasibility of the transaction described by the transaction information. The frame can then pass that feasibility assessment on to the third-party. Example operations that can take place are described in conjunction with the token return module 208 and the token transmission module 210 of FIG. 2.

In the system 300, operational flow proceeds to a token receipt module 308, which corresponds to receiving the token from the frame incorporated into the third-party webpage (e.g. the "shopping cart" webpage). In certain embodiments, the token receipt module executes a command (e.g. a "get token" command) within a webpage) to obtain the token from the frame. When the token receipt module 308 receives the token, the token includes state information that is related to the transaction and based on the transaction information provided to the remote system. The state information can also be based on available funds to the buyer, based on the amount indicated in the transaction information.

Operational flow proceeds to a state determination operation 310. The state determination operation 310 assesses the state information included in the token received at the token receipt module 308 to determine whether the transaction proposed to occur on the third-party webpage is feasible. The state determination operation 310 can, in certain embodiments, read an "approved" or "failed" indicator included in the state information. If the state determination operation 310 determines that the transaction is approved (i.e. the buyer has sufficient funds in the designated account to purchase the goods/services), operational flow proceeds to a request receipt module 312. If the state determination operation 310 determines that the transaction is not approved, or has "failed" (i.e. the buyer has insufficient funds, the account is not recognized, or other errors), operational flow branches to an end operation 318, described below.

The receipt module 312 corresponds to the webpage receiving a request to execute the transaction described by the transaction information. The request is generally received from a buyer visiting the third-party webpage by detecting the buyer clicking a "purchase" button on the website to complete the transaction.

The token transmission module 314 transmits the token from the third-party to the remote server, thereby returning the token to the remote server and triggering a funds transfer operation on the remote server (e.g. through operation of a funds transfer module 216 of FIG. 2). From the token transmission module 314, operational flow proceeds to a transaction execution module 316, in which the transaction is registered for completion. This can include, for example, queueing goods for shipment to the buyer, initiating inventory and shipping procedures, or scheduling services to be performed in accordance with the transaction described in the "shopping cart" webpage. The transaction execution module 314 also optionally displays a confirmation webpage, indicating successful completion of the transaction. An example of such a page is shown in FIG. 10, below.

From the transaction execution module 316 (or a "failed" state determination operation 310, above), operational flow proceeds to an end operation 318. The end operation corresponds to completion of an attempted transaction, either by completion of the transaction or by aborting the transaction.

Figure 4:
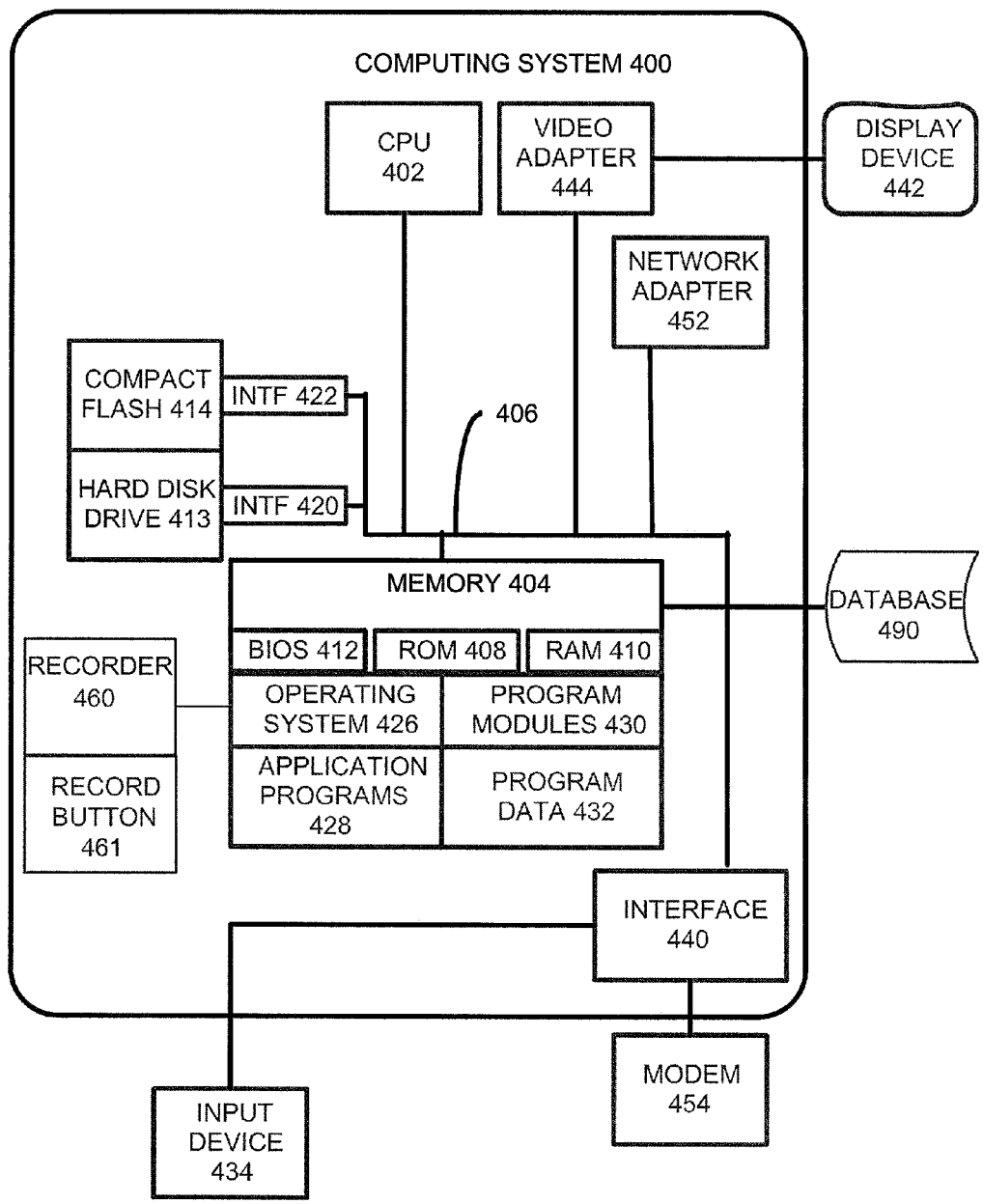
FIG. 4 illustrates the architecture of a computing system that can be used to implement aspects of the present disclosure.

Referring now to FIG. 4, an exemplary environment for implementing embodiments of the present disclosure includes a general purpose computing device in the form of a computing system 400, including at least one processing system 402. In the various embodiments described herein, the general purpose computing device can correspond to the various computing devices of FIG. 1, such as the electronic devices, the financial server, or the third-party service provider. A variety of processing units 402 are available from a variety of manufacturers, for example, Intel or Advanced Micro Devices. The computing system 400 also includes a system memory 404, and a system bus 406 that couples various system components including the system memory 404 to the processing unit 402. The system bus 406 might be any of several types of bus structures including a memory bus, or memory controller; a peripheral bus; and a local bus using any of a variety of bus architectures.

Preferably, the system memory 404 includes read only memory (ROM) 408 and random access memory (RAM) 410. A basic input/output system 412 (BIOS), containing the basic routines that help transfer information between elements within the computing system 400, such as during start up, is typically stored in the ROM 408.

Preferably, the computing system 400 further includes a secondary storage device 413, such as a hard disk drive, for reading from and writing to a hard disk (not shown), and/or a compact flash card 414.

The hard disk drive 413 and compact flash card 414 are connected to the system bus 406 by a hard disk drive interface 420 and a compact flash card interface 422, respectively. The drives and cards and their associated computer readable media provide nonvolatile storage of computer readable instructions, data structures, program modules and other data for the computing system 400.

Although the exemplary environment described herein employs a hard disk drive 413 and a compact flash card 414, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 413, compact flash card 414, ROM 408, or RAM 410, including an operating system 426, one or more application programs 428, other program modules 430, and program data 432. A user may enter commands and information into the computing system 400 through an input device 434. Examples of input devices might include a keyboard, mouse, microphone, joystick, game pad, satellite dish, scanner, digital camera, touch screen, and a telephone. These and other input devices are often connected to the processing unit 402 through an interface 440 that is coupled to the system bus 406. These input devices also might be connected by any number of interfaces, such as a parallel port, serial port, game port, or a universal serial bus (USB). A display device 442, such as a monitor or touch screen LCD panel, is also connected to the system bus 406 via an interface, such as a video adapter 444. The display device 442 might be internal or external. In addition to the display device 442, computing systems, in general, typically include other peripheral devices (not shown), such as speakers, printers, and palm devices.

When used in a LAN networking environment, the computing system 400 is connected to the local network through a network interface or adapter 452. When used in a WAN networking environment, such as the Internet, the computing system 400 typically includes a modem 454 or other means, such as a direct connection, for establishing communications over the wide area network. The modem 454, which can be internal or external, is connected to the system bus 406 via the interface 440. In a networked environment, program modules depicted relative to the computing system 400, or portions thereof, may be stored in a remote memory storage device. It will be appreciated that the network connections shown are exemplary and other means of establishing a communications link between the computing systems may be used.

The computing system 400 might also include a recorder 460 connected to the memory 404. The recorder 460 includes a microphone for receiving sound input and is in communication with the memory 404 for buffering and storing the sound input. Preferably, the recorder 460 also includes a record button 461 for activating the microphone and communicating the sound input to the memory 404.

A computing device, such as computing system 400, typically includes at least some form of computer-readable media. Computer readable media can be any available media that can be accessed by the computing system 400. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 400.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

FIG. 5 illustrates an example schematic webpage 500 incorporating a frame with which data can be exchanged, according to a possible embodiment of the present disclosure. The webpage 500 illustrates a method of instantiating a frame 502 in a webpage in which data can be shared between the webpage and the frame. In the embodiment shown, the webpage 300 calls the frame using a sendData command from a webpage 300 hosted by a third-party, illustrated as residing at the example web address http://www.3rdparty_website_here.com. The host webpage 500 includes a "sendData" function which triggers loading of the frame 502 in the webpage and calls the frame from the hyperlink targeted by the function (in this case, the example web address http://www.revolutionmoney.com/exchange/ . . . ). The "sendData" function also passes data to the source of the frame information, identified by the link. The frame 502 includes content loaded based on the target hyperlink. The frame includes an operation to complete upon loading of the frame, as indicated by the Window.onLoad=function ( ) code, which defines the size, position and other attributes of the frame.

In the context of the present disclosure, the third-party website will include code capable of calling a frame and sharing data, e.g. transaction data, with the source of that frame (e.g. a remote server, such as the financial server 110 of FIG. 1). The source of content for the frame also provides the token used for managing real-time access to state information regarding the transaction to the third-party, as described above.

Referring now to FIGS. 6-10, a particular implementation of the methods and systems described above is discussed in conjunction with an online transaction representing a sale of goods or services. The online transaction referred to in the below figures can represent a sale (third-party host or local host) occurring on a third-party server, such as a server of an online retailer, an online auction site, or other online transaction facilitator.

The below example illustrates that payment steps inserted into a third-party website through use of a frame and token system allows for an uninterrupted purchase flow relating to existing "shopping cart" systems, while providing payment preapproval in advance of executing a purchase or sale. Furthermore, the example illustrates that payment authentication steps using aspects of the present disclosure can be performed in the frame while remaining within a shopping cart environment or other transaction completion environment (i.e. not rerouting the user to a separate website for payment).

FIG. 6 illustrates a schematic shopping cart webpage 600 including a frame displaying payor authentication fields, according to a possible embodiment of the present disclosure. The shopping cart webpage as displayed illustrates an example output following execution of the host module 304 of FIG. 3. As described in conjunction with FIG. 5, the shopping cart webpage 600 includes a frame 602 generated within the page, which includes content retrieved from a remote server, such as a financial server. The content displayed in the frame includes user authentication information, such as could be generated by the content module 204 of FIG. 2. The user authentication information includes, in the embodiment shown, a username request field 604 and a password request field 606. Other user authentication information fields could be included as well.

FIG. 7 illustrates the shopping cart webpage 600 of FIG. 6, after the user of the page has entered proper authentication information into the frame 602. The state of the shopping cart webpage shown in FIG. 7 can be reached, for example, during operation of the transaction information receipt module 206 of FIG. 2, and prior to operation of the transaction information module 306 of FIG. 3. The frame 602 displays a payment confirmation request, including a message requesting confirmation of the payment amount and a confirmation button 610. The confirmation button 610 triggers confirmation of the funds transfer in conjunction with the transaction information displayed to the user (including the amount of funds involved in the transaction).

Figure 8:
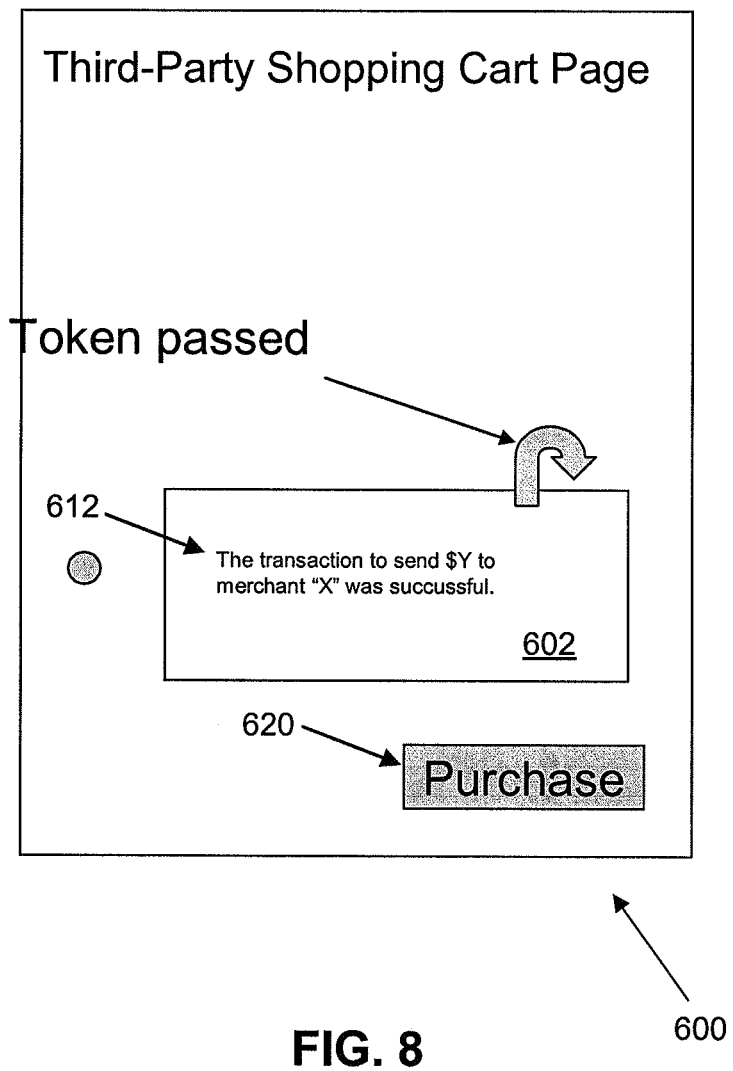
FIG. 8 illustrates the schematic shopping cart webpage of FIG. 6 including a frame displaying a purchase request message, according to a possible embodiment of the present disclosure.

FIG. 8 illustrates the schematic shopping cart webpage 600 of FIG. 6, including a frame 602 displaying a funds confirmation message 612, according to a possible embodiment of the present disclosure. This version of the webpage can be reached, for example, following user selection of the confirmation button 610 of FIG. 7, and operation of a particular embodiment of the state assessment operation 310 of FIG. 3.

The funds confirmation message 612 provides an indication to the user of the webpage (e.g. the buyer) that the funds confirmation was successful. This can include, as previously discussed, a confirmation that the user's account was successfully located and that account contained sufficient funds to complete the transaction. The funds confirmation message 612 is returned from the remote server for display to the webpage 600 at the same time a token is returned to the frame 602 from the remote server. The frame 602 then transfers this token to the third-party webpage 600 for use by the third-party. The token transmission steps are described in greater detail above in conjunction with the token return module 208 and the token transmission module 210 of FIG. 2.

In the embodiment shown, the shopping cart webpage includes a purchase button 620 supplied by the webpage 600 outside of the frame 602. User selection of the purchase button causes the third-party webpage 600 to send the token received from the remote server (e.g. the financial server 110 of FIG. 1) via the frame 602 back to the remote server to initiate a funds transfer operation. Selection of the purchase button triggers the process shown in FIG. 9, and causes display of a confirmation page 1000 as shown in FIG. 10.

Figure 9:
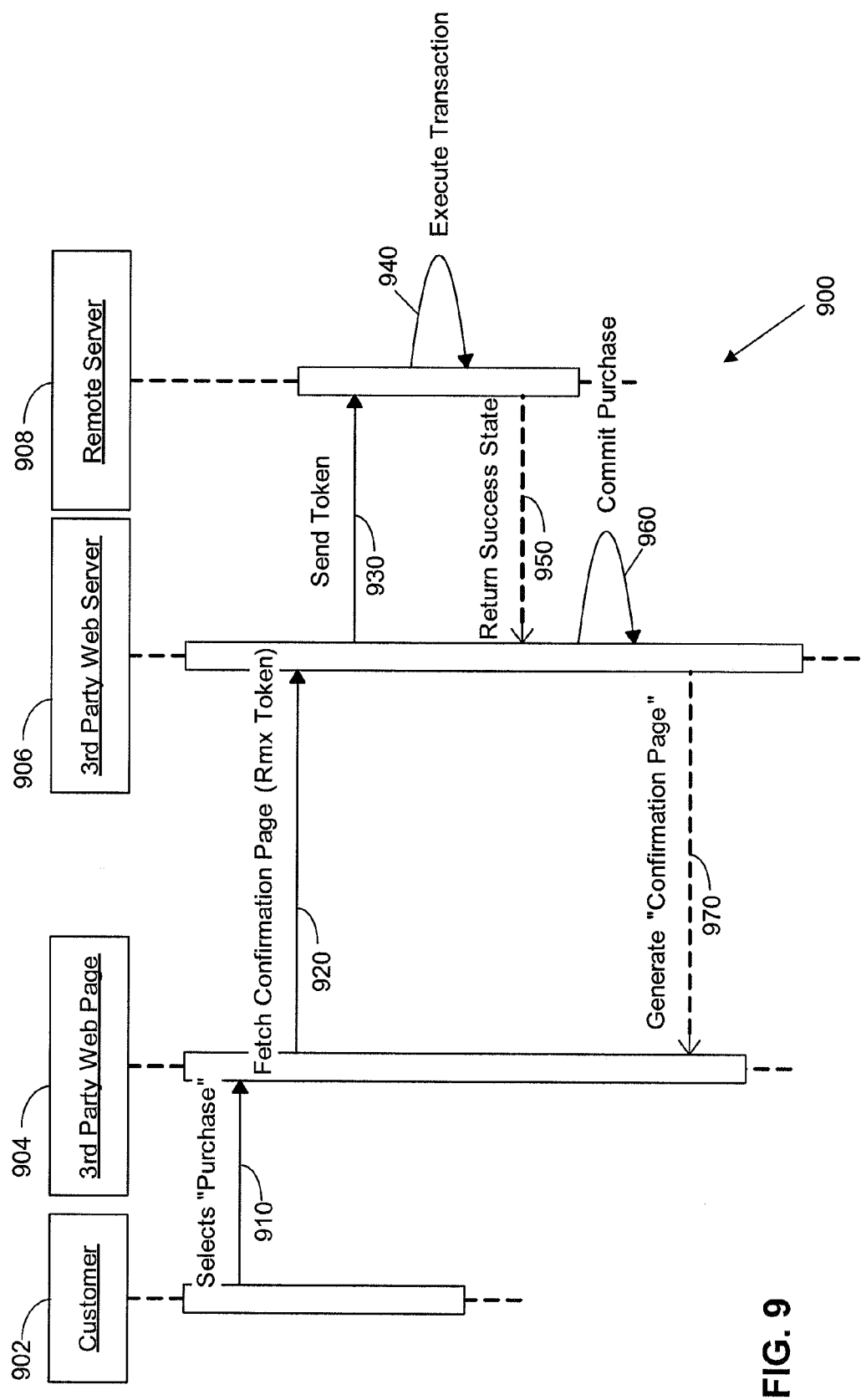
FIG. 9 is a schematic data flow diagram of data exchanged during a purchase of goods or services according to a possible embodiment of the present disclosure.

FIG. 9 is a schematic data flow diagram 900 of data exchanged during a purchase of goods or services according to a possible embodiment of the present disclosure. The flow diagram 900 illustrates communication between a customer 902, a third-party webpage 904, a third-party server 906, and a remote server upon selection of the purchase button 620 of FIG. 8. In the embodiment shown, the customer 902 can represent a buyer or seller using a website hosted by the third-party for executing purchase or sales transactions. The third-party webpage 904 is generally a webpage hosted by the third-party and displayed to the customer 902. The third-party server 906 can be the hosting server of the third-party webpage 904 or another server controlled by the same entity. The remote server 908 corresponds to the entity facilitating the financial transaction, such as a financial server 110 of FIG. 1.

An example data flow to complete the purchase proceeds as follows. A customer 902 sends a purchase command 910 to the third-party webpage 904 by selecting the purchase button 620 of FIG. 8. The third-party webpage 904 in turn transmits the transaction in a transaction message 920, including the token received at the webpage from the frame, to the third-party server 906. The transaction message 920 generally includes the information entered by the user into the third-party webpage 904 in conjunction with the purchase, such as product identification information, as well as the token received from the frame. The third-party server 906 transmits the token in a token message 930 to the remote server 908, which executes the funds transfer in a funds transfer operation 940 and returns a success state message 950 to the third-party server 906. The third-party server 906 commits the purchase in a commit purchase operation 960, and transmits a confirmation page message 970 (e.g. the confirmation webpage 1000 of FIG. 10) for display to the customer 902.

FIG. 10 illustrates a schematic confirmation webpage 1000 displayed following execution of a purchase of goods or services. The confirmation webpage is displayed following execution of the transaction, as illustrated in the transaction execution module 316 of FIG. 3, and can represent the confirmation page transmitted by the confirmation page message 970 of FIG. 9. The confirmation webpage 1000 communicates a message to the buyer indicating successful completion of the transaction.

Referring now to FIGS. 1-10, it can be seen that the process for facilitating online transactions described herein can be implemented in existing websites with little effort, in that only a few lines of code are required for implementation by a third-party. Further, third-party transaction completion process flow is not interrupted; rather, the frame inserted into the third-party website can interact with the website to provide real-time information regarding payment feasibility to that third-party and to the customer (buyer or seller) of that third-party. Also, confirmation of payment can be performed prior to (or in the absence of) actual execution of the transaction.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method comprising:
   receiving, by a website server, code in response to a non-existent preset payment relationship with value transfer services,
      wherein the code authorizes in-page transaction confirmation by data sharing between a first frame managing a fund transfer and a website hosted by the website server,
   receiving, by the website server and in response to the code being executed, content;
   displaying, by the web site server, the content in the first frame of a webpage,
      wherein the webpage comprises the first frame and a second frame;
   submitting, by the website server, transaction information from the first frame to the remote system;
   displaying, by the website server, at least a portion of the transaction information in the second frame;
   receiving, by the web site server, a token from the first frame,
      wherein the token includes state information based on the transaction information, receiving, by the web site server, the token from the first frame; and
   transmitting, by the web site server, the token to the remote server,
      wherein, in response to the remote server receiving the token from the web site server, the remote server transfers the funds from a first account to a second account based on the transaction information and the state information.

2. The method of claim 1, wherein the first account is a customer account and the second account is a seller account.

3. The method of claim 1, wherein the second account is an account of the third-party.

4. The method of claim 1, wherein the receiving content includes receiving a user authentication page for display in the first frame.

5. The method of claim 1, wherein the transaction information includes purchase data.

6. The method of claim 1, wherein the transaction information includes a funds amount.

7. The method of claim 1, further comprising receiving a confirmation page for display in the first frame.

8. The method of claim 1, wherein the transaction information relates to a purchase of at least one of goods or services.

9. The method of claim 1, wherein the state information includes a confirmation of available funds based on the transaction information.

10. The method of claim 1, wherein a confirmation of available funds is based on account information related to a user.

11. The method of claim 1, wherein a confirmation of available funds is based on an account balance related to a user.

12. The method of claim 1, wherein the first frame directs interested buyers to the website.

13. The method of claim 1, wherein the website is managed by a remote system acting as an exchange facilitator to manage funds transfer within the first frame.

14. The method of claim 1, wherein the website is hosted by a third-party on the website server.

15. The method of claim 1, wherein the remote system verifies, based on the state information, an existence of a first account based on the state information.

16. The method of claim 1, wherein the remote system confirms, based on the state information, that a sufficient amount of funds exist in a first account for transferring funds from the first account to a second account, prior to the transferring of funds.

17. The method of claim 1, wherein the remote system confirms, based on the receiving of the token, that the website server approved the transferring, and wherein the receiving of the token indicates that the website server approved the transferring.

18. A website server, comprising:
   a network interface communicating with a memory;
   the memory communicating with a processor; and
   the processor, when executing the computer program, performs operations comprising:
      receiving, by the website server, code in response to a non-existent preset payment relationship with value transfer services,
         wherein the code authorizes in-page transaction confirmation by data sharing between a first frame managing a fund transfer and a website hosted by the website server,
      receiving, by the website server and in response to the code being executed, content;
      displaying, by the website server, the content in the first frame of a webpage,
         wherein the webpage comprises the first frame and a second frame;
      submitting, by the website server, transaction information from the first frame to the remote system;
      displaying, by the website server, at least a portion of the transaction information in the second frame;
      receiving, by the web site server, a token from the first frame,
         wherein the token includes state information based on the transaction information, receiving, by the web site server, the token from the first frame; and transmitting, by the web site server, the token to the remote server, wherein, in response to the remote server receiving the token from the web site server, the remote server transfers the funds from a first account to a second account based on the transaction information and the state information.

19. A non-transitory computer-readable storage medium having computer-executable instructions stored thereon that, in response to execution by a website server, causes the website server to perform operations comprising:

receiving, by the website server, code in response to a non-existent preset payment relationship with value transfer services, wherein the code authorizes in-page transaction confirmation by data sharing between a first frame managing a fund transfer and a website hosted by the website server, receiving, by the website server and in response to the code being executed, content;

displaying, by the web site server, the content in the first frame of a webpage, wherein the webpage comprises the first frame and a second frame;

submitting, by the website server, transaction information from the first frame to the remote system;

displaying, by the website server, at least a portion of the transaction information in the second frame;

receiving, by the web site server, a token from the first frame, wherein the token includes state information based on the transaction information, receiving, by the web site server, the token from the first frame; and transmitting, by the web site server, the token to the remote server, wherein, in response to the remote server receiving the token from the web site server, the remote server transfers the funds from a first account to a second account based on the transaction information and the state information.

* * * * *